(12) United States Patent
Azuma (10) Patent No.: US 11,242,786 B2
(45) Date of Patent: Feb. 8, 2022

(54) CONTROL DEVICE FOR EXHAUST PURGING SYSTEM

(71) Applicant: DENSO CORPORATION, Kariya (JP)

(72) Inventor: Kazunari Azuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/209,630

(22) Filed: Mar. 23, 2021

(65) Prior Publication Data

US 2021/0207512 A1 Jul. 8, 2021

Related U.S. Application Data

(63) Continuation of application No. PCT/JP2019/033675, filed on Aug. 28, 2019.

(30) Foreign Application Priority Data

Sep. 25, 2018 (JP) .............................. JP2018-179511

(51) Int. Cl.
*F01N 3/08* (2006.01)
*B01D 53/94* (2006.01)
*F01N 3/10* (2006.01)
*F01N 3/20* (2006.01)

(52) U.S. Cl.
CPC ....... *F01N 3/0885* (2013.01); *B01D 53/9422* (2013.01); *B01D 53/9495* (2013.01); *F01N 3/101* (2013.01); *F01N 3/2066* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,707,682 | B2 * | 4/2014 | Bisaiji | .................. F01N 11/007 60/286 |
| 2008/0131346 | A1 | 6/2008 | Morita et al. | |
| 2009/0288391 | A1 * | 11/2009 | Aoki | ..................... F01N 11/007 60/273 |

(Continued)

FOREIGN PATENT DOCUMENTS

| | | |
|---|---|---|
| JP | 2002-349316 | 12/2002 |
| JP | 2004-176722 | 6/2004 |

(Continued)

*Primary Examiner* — Binh Q Tran
(74) *Attorney, Agent, or Firm* — Nixon & Vanderhye P.C.

(57) ABSTRACT

The present disclosure relates to ECU for an exhaust purging system comprises: a NOx catalyst provided in an exhaust passage; and a second composite sensor detecting an air-fuel ratio in a downstream of the NOx catalyst, the ECU, which performs a routine of a purge control, calculates the sum of values of the reductant that have been supplied to the NOx catalyst since the start of the routine of the purge control, determines whether the sum is greater than or equal to an end determination threshold, determines whether the air-fuel ratio is less than or equal to a predetermined value, and ends the routine of the purge control in response to an earlier one of a first affirmative determination that the sum is greater than or equal to the end determination threshold and a second affirmative determination that the air-fuel ratio is less than or equal to the predetermined value.

5 Claims, 6 Drawing Sheets

(56) References Cited

U.S. PATENT DOCUMENTS

| | | | | |
|---|---|---|---|---|
| 2009/0313970 | A1* | 12/2009 | Iida | F01N 3/0842 |
| | | | | 60/276 |
| 2015/0096287 | A1* | 4/2015 | Qi | F01N 13/0093 |
| | | | | 60/286 |
| 2015/0328586 | A1* | 11/2015 | Zeng | F01N 9/00 |
| | | | | 423/212 |
| 2017/0306818 | A1* | 10/2017 | Ito | F01N 3/0842 |
| 2021/0207512 | A1* | 7/2021 | Azuma | F01N 3/24 |

FOREIGN PATENT DOCUMENTS

| | | |
|---|---|---|
| JP | 2007-255209 | 10/2007 |
| JP | 2008-038890 | 2/2008 |
| WO | 00/19075 | 4/2000 |

\* cited by examiner

CONTROL DEVICE FOR EXHAUST PURGING SYSTEM

CROSS-REFERENCE TO RELATED APPLICATION

The present application is a continuation application of International Application No. PCT/JP2019/033675, filed on Aug. 28, 2019, which claims priority to Japanese Patent Application No. 2018-179511 filed on Sep. 25, 2018. The contents of these applications are incorporated herein by reference in their entirety.

BACKGROUND

Technical Field

The present disclosure relates to a control device used for an exhaust purging system.

Background Art

Conventionally, an exhaust purging device of an internal combustion engine includes a three-way catalyst, and a NOx catalyst provided downstream of the three-way catalyst. The NOx catalyst, for example, stores the NOx discharged under lean conditions and reduces the stored NOx during rich operation to therefore purify the exhaust gas.

SUMMARY

In the present disclosure, provided is a control device for an exhaust purging system as the following. The exhaust purging system includes: a NOx catalyst provided in an exhaust passage; and an air-fuel ratio sensor that detects an air-fuel ratio in a downstream portion of the exhaust passage, the downstream portion of the exhaust passage being located at a downstream of the NOx catalyst in the exhaust passage, the control device, which performs a routine of a purge control, calculates the sum of values of the reductant that have been supplied to the NOx catalyst since the start of the routine of the purge control, determines whether the sum of the values of the reductant calculated by the sum calculation unit is greater than or equal to an end determination threshold, determines whether the air-fuel ratio in the downstream portion of the exhaust passage detected by the air-fuel ratio sensor is less than or equal to a predetermined value after the start of the routine of the purge control, and ends the routine of the purge control in response to an earlier one of a first affirmative determination that the sum of the values of the reductant calculated by the sum calculation unit is greater than or equal to the end determination threshold and a second affirmative determination that the air-fuel ratio detected by the air-fuel ratio sensor is less than or equal to the predetermined value after the start of the routine of the purge control.

BRIEF DESCRIPTION OF THE DRAWINGS

The above object, other objects, features, and advantages of the present disclosure will become more apparent from the following detailed description with reference to the accompanying drawings. In the accompanying drawings.

DETAILED DESCRIPTION OF THE PREFERRED EMBODIMENTS

Conventionally known is an exhaust purging device of an internal combustion engine described in Patent Document 1. In this exhaust purging device, a sum of values of the reductant supplied during purge control, which reduces the NOx under rich conditions, is calculated, and the routine of the purge control ends when the sum of values of the reductant is greater than or equal to a predetermined value. Specifically, a control device of the purging device calculates the values of the reductant supplied to the purging device on the basis of an output of an air-fuel ratio sensor provided in the upstream of the three-way catalyst, predicts the values of the reductant consumed in the three-way catalyst, and estimates the sum of values of the reductant supplied to the NOx catalyst. Further, the routine of the purge control ends when the estimated the sum of values of the reductant supplied to the NOx catalyst is greater than or equal to a predetermined value.

[PTL 1] JP 4759496 B2

In the exhaust purging device of PTL 1, an end determination of the routine of the purge control is made solely by an estimation of the sum of values of the reductant supplied. However, it is known that the values of the reductant actually used by the NOx catalyst for reduction varies due to various factors. If such a variation causes the estimated the sum of values of the reductant supplied to exceed the values of the reductant actually used, HC emissions and fuel consumption can deteriorate, which is undesirable.

The present disclosure has been made in view of the problems above, and a primary object is to provide a control device for an exhaust purging system which is capable of suppressing deterioration of an exhaust gas while reducing NOx in an appropriate manner.

The aspect is a control device for an exhaust purging system, that comprises: a NOx catalyst provided in an exhaust passage of an internal combustion engine, the NOx catalyst serving as an NOx storage-reduction catalyst that stores NOx included in an exhaust gas and reduces the stored NOx with a reductant to accordingly purify the stored NOx; and an air-fuel ratio sensor that detects an air-fuel ratio in a downstream portion of the exhaust passage, the downstream portion of the exhaust passage being located at a downstream of the NOx catalyst in the exhaust passage, the control device, which performs a routine of a purge control that supplies the reductant into an upstream portion of the exhaust passage to cause the NOx catalyst to perform NOx reduction, the upstream portion of the exhaust passage being located at an upstream of the NOx catalyst in the exhaust passage, comprising: a sum calculation unit that calculates the sum of values of the reductant that have been supplied to the NOx catalyst since the start of the routine of the purge control; a first determination unit that determines whether the sum of the values of the reductant calculated by the sum calculation unit is greater than or equal to an end determination threshold; a second determination unit that determines whether the air-fuel ratio in the downstream portion of the exhaust passage detected by the air-fuel ratio sensor is less than or equal to a predetermined value after the start of the routine of the purge control; and a purge ending unit that ends the routine of the purge control in response to an earlier one of a first affirmative determination that the sum of the values of the reductant calculated by the sum calculation unit is greater than or equal to the end determination threshold and a second affirmative determination that the air-fuel ratio detected by the air-fuel ratio sensor is less than or equal to the predetermined value after the start of the routine of the purge control.

In the present means, two determination conditions are provided as end conditions of the routine of the purge control, and the routine of the purge control ends at the stage when the earlier of the end determination conditions is satisfied. In the first end determination condition, the sum of values (quantities) of the reductant that have been supplied to the NOx catalyst is calculated since the start of the routine of the purge control, and the routine of the purge control ends when the sum of values of the reductant is greater than or equal to an end determination threshold set in advance. On the other hand, in the second end determination condition, the routine of the purge control ends when the air-fuel ratio detected by the air-fuel ratio sensor provided in the downstream portion of the exhaust passage is less than or equal to a predetermined value, that is to say, when the reductant component actually leaks to the downstream portion of the exhaust passage, the downstream portion of the exhaust passage being located at the downstream of the NOx catalyst in the exhaust passage.

Here, it is usually more desirable for the routine of the purge control to end due to the first end determination condition. This is because the reductant component leaks to the downstream portion of the exhaust passage in the second end determination condition, the downstream portion of the exhaust passage being located at the downstream of the NOx catalyst in the exhaust passage, while in the first end determination condition, it is possible to end the routine of the purge control without the reductant component leaking to the downstream portion of the exhaust passage, the downstream portion of the exhaust passage being located at the downstream of the NOx catalyst in the exhaust passage. However, in the first end determination condition, the end determination threshold set in advance can sometimes be too large due to individual differences or deterioration of the NOx catalyst, or setting errors or the like. Therefore, when only the first end determination condition is provided, reductant is continuously supplied until the sum of values of the reductant is greater than or equal to the end determination threshold set in advance, even after the NOx catalyst has completed reduction.

Therefore, the present means is provided with the second end determination condition, and in the second end determination condition, the routine of the purge control ends when the air-fuel ratio detected by the air-fuel ratio sensor provided in the downstream portion of the exhaust passage is less than or equal to a predetermined value, the downstream portion of the exhaust passage being located at the downstream of the NOx catalyst in the exhaust passage. As a result, even when the supply amount becomes excessive due to individual differences and the like, excessive discharge of the reductant component due to individual differences and the like can be suppressed by ending the routine of the purge control when the air-fuel ratio is less than or equal to the predetermined value.

Figure 1:
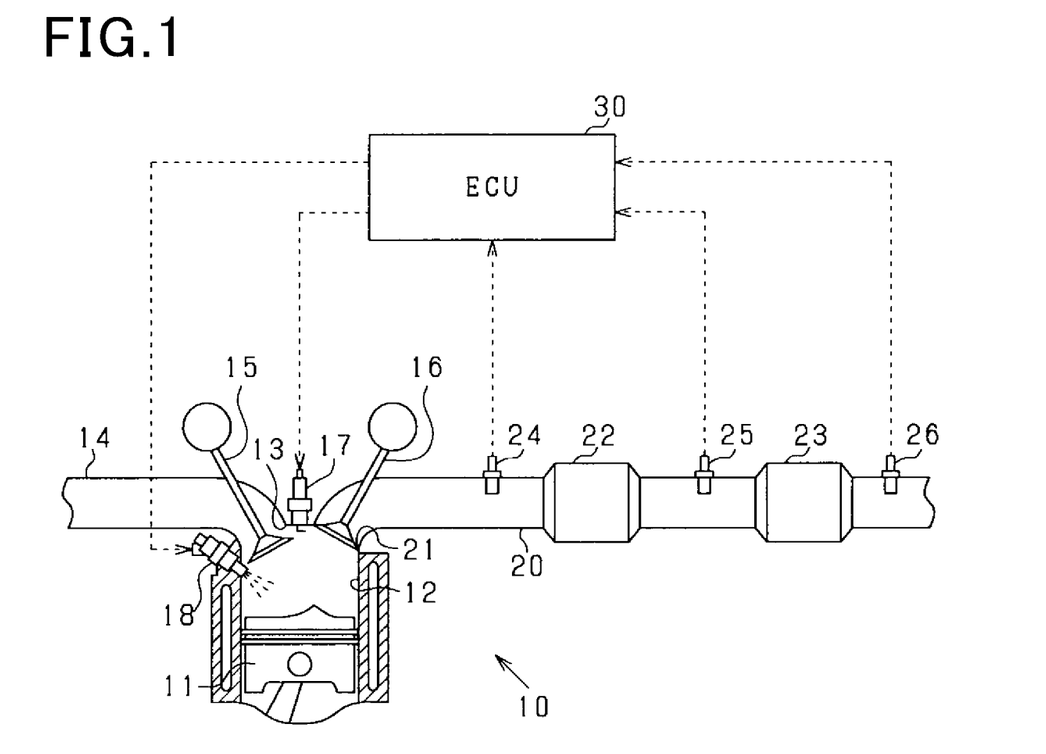
FIG. 1 is a schematic configuration diagram of an exhaust purging system of an internal combustion engine.

In the present embodiment, an engine exhaust purging system is constructed for use in an in-vehicle multi-cylinder four-cycle gasoline engine, which is an internal combustion engine. A schematic configuration diagram of such an engine exhaust purging system is shown in FIG. 1. In the diagram below, only one of the plurality of cylinders included in the engine 10 is illustrated.

A piston 11 is housed inside each cylinder of the engine 10 so as to be capable of a reciprocating motion. Further, a combustion chamber 12 is provided on the top side (upper side) of the piston 11 of each cylinder. The combustion chamber 12 communicates with an intake passage 14 via an intake port 13, and also communicates with an exhaust passage 20 via an exhaust port 21.

The intake passage 14 and the exhaust passage 20 of the engine 10 are respectively provided with an intake valve 15, which closes the intake port 13, and an exhaust valve 16, which closes the exhaust port 21. An open operation of the intake valve 15 causes the air inside the intake passage 14 to flow into the combustion chamber 12, and an open operation of the exhaust valve 16 discharges the exhaust gas inside the combustion chamber 12 into the exhaust passage 20. The timings at which the intake valve 15 and the exhaust valve 16 are each opened and closed (valve timings) are variably controlled by a variable valve timing device.

The combustion chamber 12 is provided with a spark plug 17. A high voltage is applied to the spark plug 17 at a desired ignition timing through an ignition device comprising an ignition coil or the like. As a result of applying a high voltage to the spark plug 17, an arc discharge is generated between counter electrodes, which causes ignition of the air-fuel mixture inside the combustion chamber 12.

Each cylinder of the engine 10 is provided with a fuel injection device 18 that directly supplies a fuel into the combustion chamber 12. The fuel injection device 18 is connected to a fuel tank via a fuel pipe (not shown). The fuel inside the fuel tank is supplied to the fuel injection device 18 of each cylinder, and is injected into the combustion chamber 12 from the fuel injection device 18.

In the exhaust passage 20, a three-way catalyst 22 that purifies CO, HC, and NOx in the exhaust gas, and a NOx catalyst 23, which is a NOx storage-reduction type catalyst, are provided in series. The NOx catalyst 23 stores NOx when the air-fuel ratio of the exhaust gas is in a lean state (oxidizing atmosphere), and reduces and purifies the stored NOx when the air-fuel ratio is in a rich state (reducing atmosphere). The reductant of the NOx catalyst 23 is CO and/or HC, which are generated as a result of rich combustion. Note that, rather than using the CO and/or HC generated by rich combustion as the reductant, a fuel supply valve may be provided in the exhaust passage 20, and the fuel supplied from the fuel supply valve may be used as the reductant.

In the exhaust passage 20, an air-fuel ratio sensor 24 that detects the air-fuel ratio of an exhaust gas is provided in the upstream of the three-way catalyst 22, a first composite sensor 25 is provided between the three-way catalyst 22 and the NOx catalyst 23, and a second composite sensor 26 is provided in the downstream portion of the exhaust passage, the downstream portion of the exhaust passage being located at the downstream of the NOx catalyst 23 in the exhaust passage. The composite sensors 25 and 26 have the functions of a NOx sensor and an air-fuel ratio sensor (A/F sensor). A NOx sensor and an air-fuel ratio sensor may be individually provided instead of the composite sensors 25 and 26. Furthermore, the NOx sensor function does not have to be provided. In addition, various other sensors may be provided in the exhaust passage 20. For example, an exhaust temperature sensor may be provided between the three-way catalyst 22 and the NOx catalyst 23.

The outputs of the various sensors are input to an ECU 30. The ECU 30 includes a microcomputer comprising a CPU, a ROM, a RAM, and the like, and executes various control programs stored in the ROM to therefore perform a lean control that sets the air-fuel ratio at the time of combustion to a lean state, and/or a routine of a purge control that sets the air-fuel ratio at the time of combustion to a rich state and causes the NOx catalyst 23 to perform reduction. The ECU 30 corresponds to a "control device".

Figure 2:
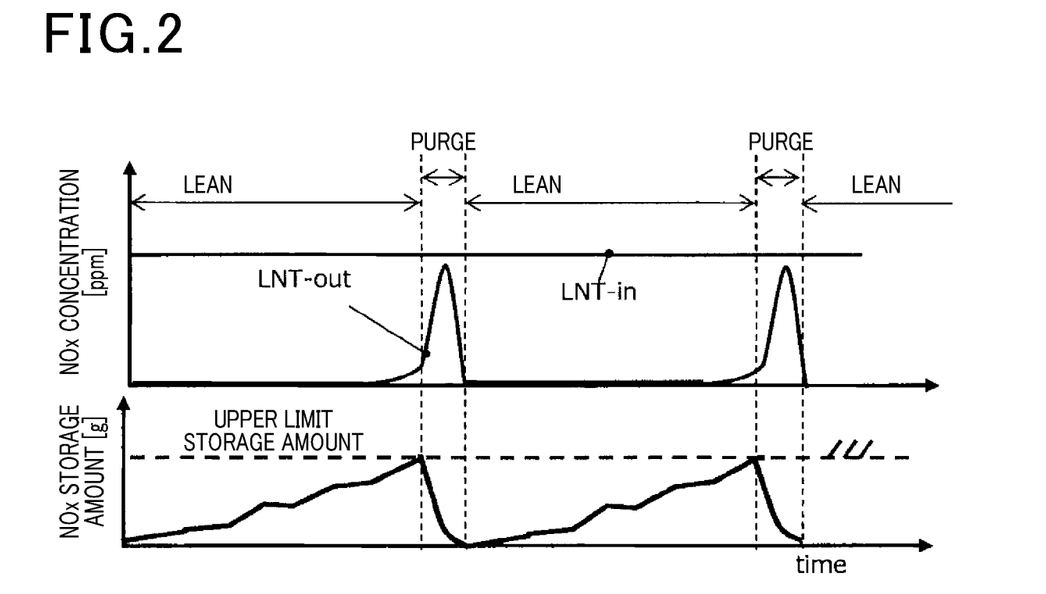
FIG. 2 is a time chart during lean operation.

Next, the timing in which the routine of the purge control is performed will be described. FIG. 2 is a time chart showing a state in which NOx is stored and reduced in a lean operation, which performs a lean control and a routine of a purge control. In FIG. 2, LNT-in represents the NOx concentration in the exhaust gas flowing into the NOx catalyst 23, and LNT-out represents the NOx concentration in the exhaust gas flowing out from the NOx catalyst 23.

During the lean control, NOx is stored in the NOx catalyst 23, and the NOx storage amount in the NOx catalyst 23 increases. The NOx storage amount is calculated by a known method. Specifically, the NOx concentration is calculated by the NOx sensor of the first composite sensor 25. Alternatively, a NOx discharge concentration from the combustion chamber 12 is calculated on the basis of operation conditions of the engine 10 such as the engine speed and the torque, and the NOx concentration after passing through the three-way catalyst 22 is calculated on the basis of the calculated NOx discharge concentration. Further, the NOx storage amount is calculated on the basis of the NOx concentration calculated by these methods.

Specifically, the NOx storage amount is calculated by the following formula.

NOx storage amount [g]=Σ(NOx concentration [ppm]×exhaust flow rate [mol/s]×NOx molar mass [g/mol]/1,000,000)

Then, when the NOx storage amount reaches a predetermined upper limit storage amount, the routine of the purge control is started. Thereafter, the NOx stored in the NOx catalyst 23 is separated from the NOx catalyst 23 and is reduced, and the NOx storage amount in the NOx catalyst 23 decreases.

Figure 3:
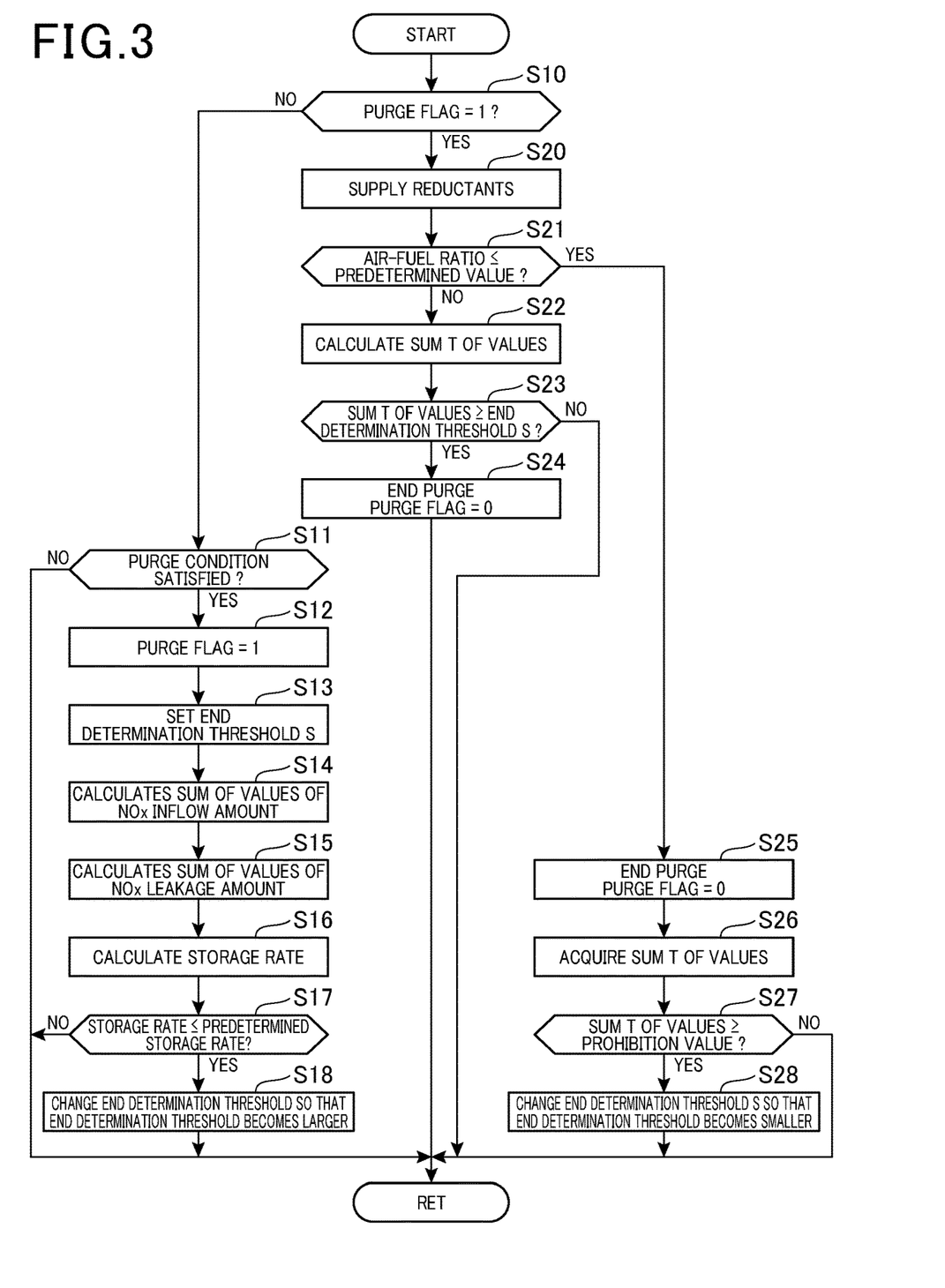
FIG. 3 is a flowchart of a process performed during lean operation.

Next, the control performed during lean operation will be described. FIG. 3 is a flowchart performed by the ECU 30, and is repeatedly executed at a predetermined cycle by the ECU 30 during lean operation.

In S10, the ECU 30 determines whether a purge flag is set to 1. The purge flag is a flag indicating whether the routine of the purge control is being executed. When the purge flag is set to 1, the routine of the purge control that causes the NOx catalyst 23 to perform reduction is performed.

In S10, if the ECU 30 determines that the purge flat is not set to 1, that is to say, that lean control is currently being performed, the process proceeds to S11, and the ECU 30 determines whether a start condition of the routine of the purge control has been satisfied. Specifically, if the NOx storage amount in the NOx catalyst 23 reaches a predetermined determination value during lean operation of the engine 10, the ECU 30 determines that the start condition of the routine of the purge control has been satisfied. In S11, if the ECU 30 determines that the start condition of the routine of the purge control has not been satisfied, the processing ends.

Figure 4:
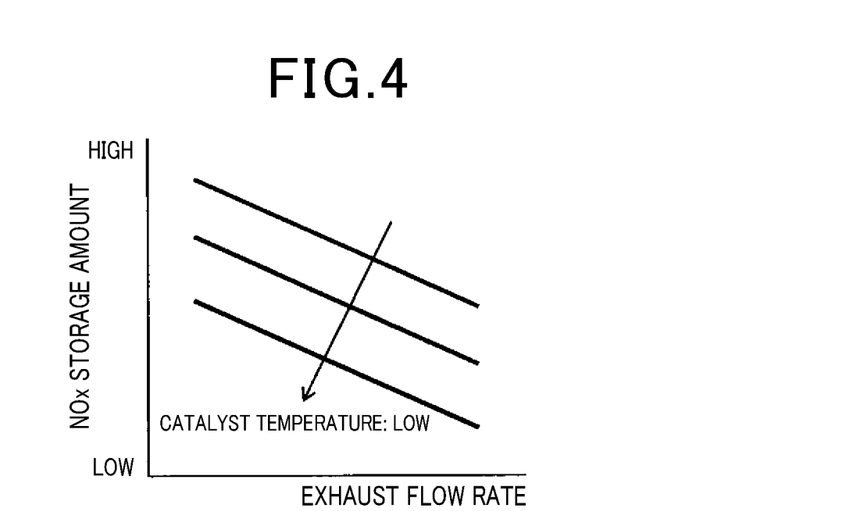
FIG. 4 is a diagram showing the relationship between an exhaust flow rate and a determination value.

The determination value of the NOx storage amount at the start of the routine of the purge control may be constant, or as shown in FIG. 4, may be determined by a relationship with the exhaust flow rate and the temperature of the NOx catalyst 23. The greater the exhaust flow rate, the shorter the reaction time between the exhaust gas and the catalyst, and the storage performance of the NOx catalyst 23 decreases. Consequently, as the exhaust flow rate during lean control increases, the determination value of the NOx storage amount set at the start of the routine of the purge control is made smaller.

Furthermore, the lower the temperature of the NOx catalyst 23, the lower the catalyst activity and the lower the storage performance Consequently, as the temperature of the NOx catalyst 23 decreases, the determination value of the NOx storage amount set at the start of the routine of the purge control is made smaller. Then, when the NOx storage amount is greater than or equal to the determination value, the start condition of the routine of the purge control is satisfied. The exhaust flow rate and/or the temperature of the NOx catalyst 23 used in the calculation of the determination value may use the average value obtained during lean control, or may use the exhaust flow rate and/or the temperature of the NOx catalyst 23 at a predetermined point in time.

Figure 5:
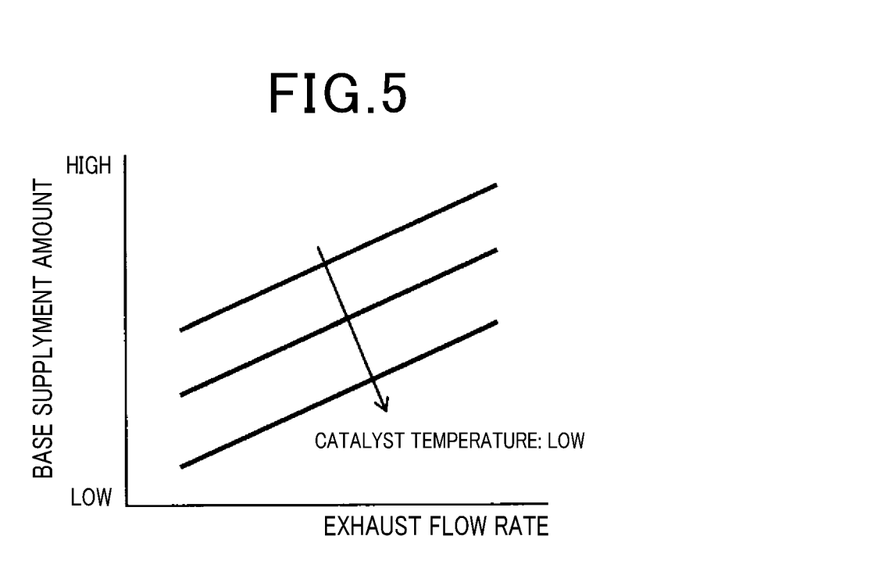
FIG. 5 is a diagram showing the relationship between an exhaust flow rate and a base supply amount during purge control.
Figure 6:
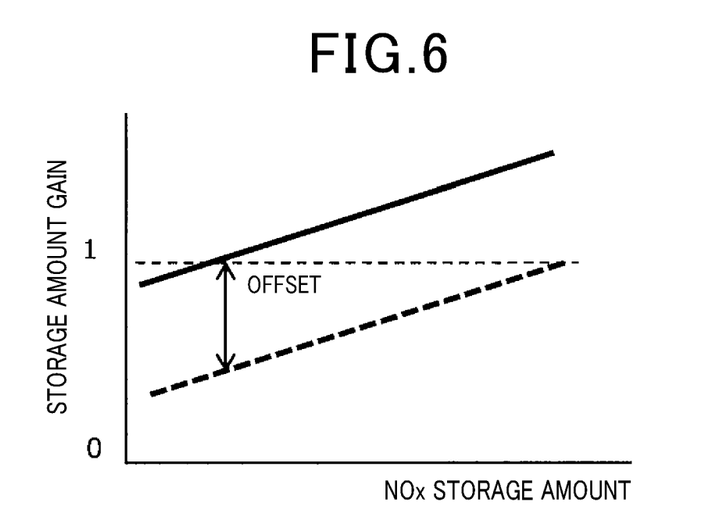
FIG. 6 is a diagram showing the relationship between a NOx storage amount and a storage amount gain.

In S11, if the ECU 30 determines that the start condition of the routine of the purge control has been satisfied, the purge flag is set to 1 in S12. Then, in S13, an end determination threshold S of the routine of the purge control is set. The end determination threshold S may be constant, or as shown in FIG. 5, may be set according to the exhaust flow rate and/or the temperature of the NOx catalyst 23, or as shown in FIG. 6, may be set according to NOx storage amount, or the like. FIG. 5 is a diagram showing the relationship between the exhaust flow rate and the base supply values of the reductant during the routine of the purge control, and FIG. 6 is a diagram showing the relationship between the NOx storage amount and the storage amount gain. The end determination threshold S is equal to the values of the reductant supplied during the routine of the purge control.

As shown in FIG. 5, for catalysts such as the three-way catalyst 22 and the NOx catalyst 23, the greater the exhaust flow rate, the shorter the reaction time between the catalyst and the reductant, and the reduction efficiency decreases. When the reduction efficiency decreases, the values of the reductant needed to reduce the stored NOx increases. Furthermore, as the temperature of the catalyst decreases, the oxygen storage capacity (OSC) of the catalyst decreases; therefore, the values of the reductant needed to reduce the stored NOx decreases. As a result, the base supply values of the reductant is calculated from the exhaust flow rate and the catalyst temperature using the relationship in FIG. 5. The exhaust flow rate and the catalyst temperature that are used may be the exhaust flow rate and the catalyst temperature at the start of purge control.

The end determination threshold S is a value which is calculated on the basis of the NOx storage amount, where the storage amount gain is calculated on the basis of the NOx storage amount, and the end determination threshold S is calculated by multiplying a predetermined base value, or a base value calculated on the basis of FIG. 5, by the storage amount gain. The storage amount gain is a coefficient which is determined according to the fact that the amount of reducing material needed in the NOx catalyst 23 increases as the NOx storage amount increases, and more specifically, as shown in FIG. 6, it is set to a higher value as the NOx storage amount in the NOx catalyst 23 becomes larger.

Furthermore, because the three-way catalyst 22 has an oxygen storage capacity (OSC), during reduction of the oxygen stored in the three-way catalyst 22 the rich component (HC, CO, and the like) needed for reduction is consumed in a reaction with the oxygen in the three-way catalyst 22, and the rich component needed for reduction is not supplied to the NOx catalyst 23 side. For this reason, the NOx catalyst 23 can not perform reduction of the stored NOx unless a certain quantity of the reductant are supplied regardless of the NOx storage amount of the NOx catalyst 23. Therefore, as shown in FIG. 6, the storage amount gain is upwardly offset by the amount of the oxygen storage capacity of the three-way catalyst 22. Then, the storage amount gain is calculated from the NOx storage amount using the relationship shown in FIG. 6.

Moreover, in S14 to S18, the NOx storage rate of the NOx catalyst 23 is calculated on the basis of an NOx inflow amount to the NOx catalyst 23, and a NOx leakage amount detected by the NOx sensor of the second composite sensor 26. The NOx storage rate can sometimes decrease as a result of accumulation of unreduced NOx due to a shortage of reductant. Specifically, when a shortage of reductant has occurred relative to the NOx storage amount in a previous purge control due to individual differences of the NOx catalyst 23 or the like, unreduced NOx accumulates in the NOx catalyst 23, the storage of NOx cannot be performed as planned, and a NOx leakage occurs in the downstream portion of the exhaust passage, the downstream portion of the exhaust passage being located at the downstream of the NOx catalyst 23 in the exhaust passage.

Therefore, in S14 to S18, is the ECU 30 determines whether a shortage of reductant has occurred in the NOx catalyst 23 relative to the amount of stored NOx. Note that the processing of S14 to S18 may be performed at predetermined intervals during lean control rather than being performed when a purge condition is satisfied in S11.

In S14, the inflow NOx amount is calculated by integrating the amount of NOx that has flowed into the NOx catalyst 23 during lean control. Specifically, the integration may be based on the amount of NOx detected by the first composite sensor 25, or the integration may be performed by calculating the amount of NOx discharged into the exhaust passage 20 on the basis of the operation state of the engine 10. The inflow NOx amount may be reset at the end of the routine of the purge control.

In S15, the amount of NOx leakage is calculated by integrating the amount of NOx that has leaked out from the NOx catalyst 23 during lean control. The sum of the amount of NOx that has leaked to the downstream portion of the exhaust passage is calculated on the basis of the amount of NOx detected by the second composite sensor 26, the downstream portion of the exhaust passage being located at the downstream of the NOx catalyst 23 in the exhaust passage. Note that, in order to calculate the sum of the amount of NOx that has leaked out from the NOx catalyst 23, it is necessary for at least a NOx sensor to be provided in the downstream portion of the exhaust passage, the downstream portion of the exhaust passage being located at the downstream of the NOx catalyst 23 in the exhaust passage. Furthermore, the amount of NOx leakage may be reset at the end of the routine of the purge control.

In S16, the NOx storage rate is calculated. The NOx storage rate (%) can be calculated using the following formula.

$$\text{NOx storage rate (\%)} = (1 - \text{amount of NOx leakage}/\text{inflow NOx amount}) \times 100$$

When unreduced NOx accumulates, the amount of NOx that can be stored decreases and the NOx leakage amount increases; therefore, the storage rate deteriorates, and the value representing the storage rate becomes smaller. Note that S14 to S16 corresponds to the "storage rate calculation unit".

In S17, the ECU 30 determines whether the storage rate calculated in S16 is lower than a predetermined storage rate. In S17, if the ECU 30 determines that the storage rate is larger than the predetermined storage rate, the processing ends. On the other hand, in S17, if the ECU 30 determines that the storage rate is less than or equal to the predetermined storage rate, the ECU 30 determines that unreduced NOx has accumulated, and in S18, the end determination threshold S is changed so that it becomes larger than the end determination threshold S set in S13, and the processing ends. That is to say, the values of the reductant supplied during the routine of the purge control is changed so that it becomes larger from the next purge control onwards, and the processing ends. In the method of changing the end determination threshold S, a new end determination threshold S is obtained by multiplying the end determination threshold S by a certain ratio larger than 1, or by increasing the end determination threshold S by a certain amount. The amount by which the end determination threshold S is increased is preferably a large value. This is because, rather than an unreduced state continuing due to a shortage in the supply amount, it is more desirable for a large change in the end determination threshold S to be made at once so that the supply amount becomes excessive, which enables the routine of the purge control to end with minimal leakage of the rich component. In addition, the amount of the change may be variable based on the storage rate. Further, S18 corresponds to the "increase changing unit".

Figure 7:
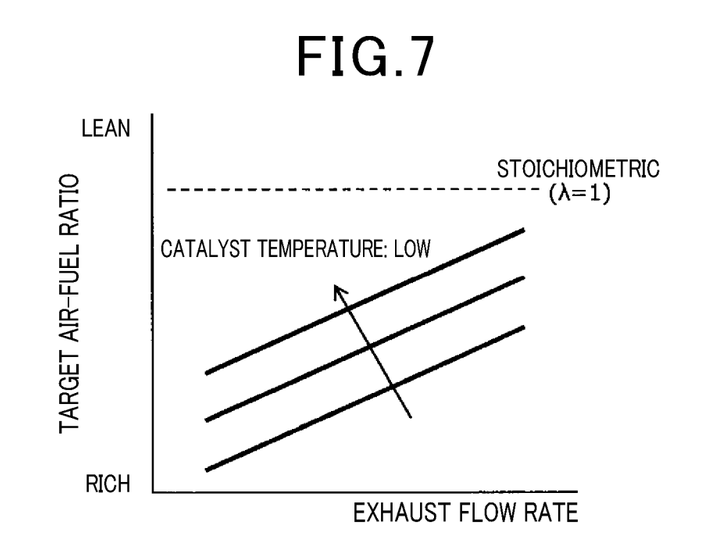
FIG. 7 is a diagram showing the relationship between an exhaust flow rate and a target air-fuel ratio during purge control.

On the other hand, in S10, if is the ECU 30 determines that the purge flag is set to 1, the reductant is supplied in S20. Specifically, fuel is injected from the fuel injection device 18 so that a predetermined rich air-fuel ratio is obtained. FIG. 7 is an example of a map for setting a target air-fuel ratio when a feedback control is performed during the routine of the purge control. In catalysts such as the three-way catalyst 22 and the NOx catalyst 23, the upper limit of the values of the reductant that can be processed per unit time changes depending on the activity of the noble metal in the catalyst. For example, because the activity decreases as the catalyst temperature decreases, the reductant processing capacity decreases. Therefore, it is desirable for the richness degree to be lowered as the catalyst temperature decreases. Furthermore, it is desirable for the richness degree to be lowered as the exhaust flow rate increases. It is desirable for the flow rate of the reductant flowing into the NOx catalyst 23 per unit time to be held constant by setting the target air-fuel ratio in this manner. Then, the target air-fuel ratio is calculated from the exhaust flow rate and the catalyst temperature using the relationship shown in FIG. 7.

In S21, the ECU 30 determines whether the air-fuel ratio detected by the second composite sensor 26 is less than or equal to a predetermined value. When reduction of the stored NOx performed by the NOx catalyst 23 ends, the rich component leaks to the downstream portion of the exhaust passage, the downstream portion of the exhaust passage being located at the downstream of the NOx catalyst 23 in the exhaust passage. In this case, the air-fuel ratio detected by the second composite sensor 26 becomes a value representing the rich side. That is to say, the ECU 30 determines whether reduction of the stored NOx performed by the NOx catalyst 23 ends, and whether the air-fuel ratio detected by the second composite sensor 26 has become a value representing the rich side. If the air-fuel ratio is greater than the predetermined value, that is to say, if the air-fuel ratio detected by the second composite sensor 26 is a value which is near a stoichiometric, and reduction of the stored NOx is performing by the NOx catalyst 23, the processing proceeds to S22.

In S22, an sum T of values of the reductant supplied since the start of the routine of the purge control is calculated. Specifically, the sum T(n) of values of the reductant is calculated by supplying the values of the reductant supplied since the previous processing to the sum T(n−1) of values of the reductant calculated in the previous processing. The values of the reductant supplied may be calculated from an excess fuel amount, that is to say, a value obtained by subtracting the equivalent fuel amount (the amount of fuel that creates a stoichiometric state with respect to the amount of air) from the fuel injection amount, or may be calculated from operation conditions such as the output value of the air-fuel ratio sensor 24, the amount of air, and the like. Note that S22 corresponds to the "sum calculation unit".

In S23, is the ECU 30 determines whether the sum T of values of the reductant calculated in S22 is greater than or equal to the end determination threshold S. If is the ECU 30 determines that the sum T of values of the reductant is less than the end determination threshold S set in S13, it is assumed that reduction of the stored NOx performed by the NOx catalyst 23 is in progress, and the processing ends.

In S23, if the ECU 30 determines that the sum T of values of the reductant is greater than or equal to the end determination threshold S set in advance, in S24, the ECU 30 determines that reduction of the stored NOx performed by the NOx catalyst 23 has ended, and the routine of the purge control ends. Specifically, the purge flag is set to 0 to return to a normal control such as lean control. Furthermore, the sum T of values of the reductant is set to 0. Note that S23 corresponds to the "first determination unit", and S24 corresponds to the "purge ending unit" that end the routine of the purge control on the basis of the result from the first determination unit.

On the other hand, in S21, if the air-fuel ratio is less than or equal to the predetermined value, that is to say, if the rich component is detected in the downstream portion of the exhaust passage, the process proceeds to S25, the downstream portion of the exhaust passage being located at a downstream of the NOx catalyst 23 in the exhaust passage. In S25, is the ECU 30 determines that reduction of the stored NOx performed by the NOx catalyst 23 has ended, and the routine of the purge control ends. Specifically, the purge flag is reset to 0 to return to a normal control. Note that S21 corresponds to the "second determination unit", and S25 corresponds to the "purge ending unit" that ends the routine of the purge control on the basis of the result from the second determination unit.

If the routine of the purge control ends based on the result of the second determination unit rather than the result of the first determination unit, the end determination threshold S that has been set is larger than the values of the reductant actually used for reduction, and there is a concern that the values of the reductant supplied has become excessive. When the end determination threshold S is excessive, the rich component flows to the downstream portion of the exhaust passage, which is not favorable, the downstream portion of the exhaust passage being located at a downstream of the NOx catalyst 23 in the exhaust passage. Therefore, when the end determination threshold S is excessive, it is necessary to change the end determination threshold S so that it becomes smaller from the next purge control onwards.

In addition, when a high concentration (or a high flow rate) of the reductant is momentarily supplied during execution of the routine of the purge control, the reductant processing capacity of the NOx catalyst 23 is exceeded, and a reductant leaks to the downstream portion of the exhaust passage in a phenomenon referred to as a blow-by of the reductant, the downstream portion of the exhaust passage being located at a downstream of the NOx catalyst 23 in the exhaust passage. If a blow-by of the reductant occurs, the air-fuel ratio detected in the downstream portion of the exhaust passage momentarily is less than or equal to the predetermined value, the downstream portion of the exhaust passage being located at a downstream of the NOx catalyst 23 in the exhaust passage. In such a case, if is the ECU 30 determines that the values of the reductant are excessive and the end determination threshold S is changed, a reductant shortage will occur from the routine of the purge control onwards. Therefore, in S26 and S27, is the ECU 30 determines whether the supply amount is excessive due to the end determination threshold S being too high, or a blow-by of the reductant has occurred.

In S26, the sum T of values of the reductant is acquired. Specifically, in the same manner as S22, the sum T(n) of values of the reductant is calculated by supplying the values of the reductant supplied since the previous processing to the sum (n−1) of values of the reductant calculated in the previous processing. The sum T of values of the reductant becomes the sum T of values of the reductant since the start of the routine of the purge control until the end point. Further, in S27, is the ECU 30 determines whether the sum T of values of the reductant acquired in S26 is greater than a prohibition value. The prohibition value is a value which is smaller than the end determination threshold S, and is a value that is too small to be the sum T of values of the reductant when reduction of the stored NOx performed by the NOx catalyst 23 ends normally. Specifically, the prohibition value is a value which is approximately half the end determination threshold S. In S27, after determining whether the sum T of values of the reductant is greater than the prohibition value, the sum T of values of the reductant is set to 0. Furthermore, rather than performing the processing that sets the sum T of values of the reductant to 0 after the routine of the purge control ends (S24 or S27), it is possible to perform processing that sets the previous sum T of values of the reductant to 0 in S12, that is to say, at the start of the routine of the purge control.

In S27, if the sum T of values of the reductant is less than the prohibition value, is the ECU 30 determines that a blow-by of the reductant has occurred, and the processing ends. On the other hand, in S23, if the sum T of values of the reductant is greater than the prohibition value, in S28, the end determination threshold S set in S13 is changed to a smaller value, and the processing ends. That is to say, a change is made that decreases the values of the reductant supplied during the routine of the purge control from the next purge control onwards, and the processing ends. In the method of changing the end determination threshold S, a new end determination threshold S is obtained by multiplying the end determination threshold S by a certain ratio smaller than 1, or by decreasing the end determination threshold S by a certain amount. The amount by which the end determination threshold S is decreased is preferably a small value. This is because, if a large change is made at once, there is a concern that the values of the reductant supplied may become insufficient, leading to insufficient reduction. Furthermore, the amount of the change may be varied based on the difference between the end determination threshold S and the sum T of values of the reductant, or based on the sum T of values of the reductant. In addition, S28 corresponds to the "decrease changing unit".

Figure 8A:
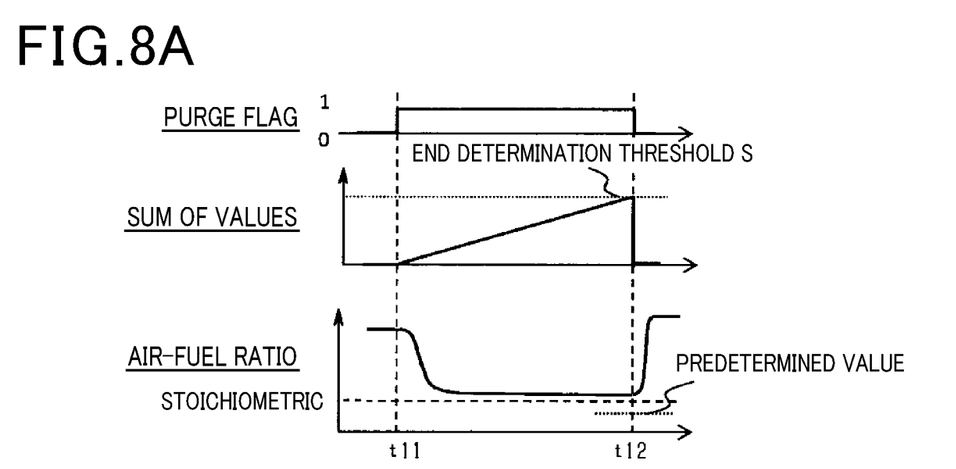
FIG. 8A, FIG. 8B, and FIG. 8C are a time chart during execution of purge control.
Figure 8B:
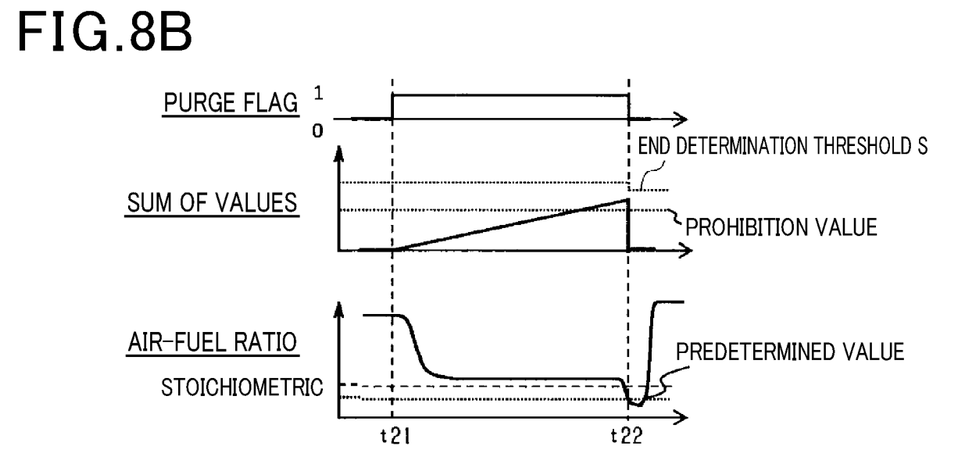
Figure 8C:
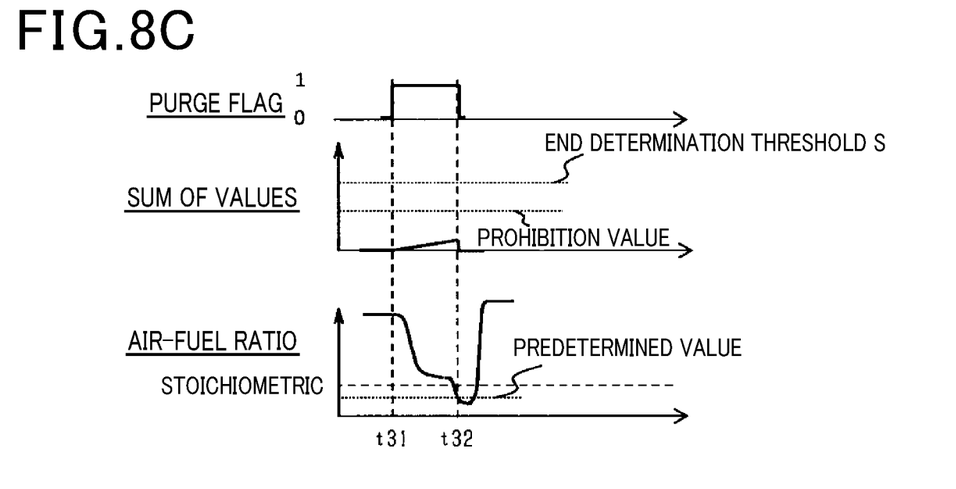

FIG. 8 is a time chart during execution of purge control. Specifically, FIG. 8A is a timechart showing a case where the routine of the purge control ends due to the sum T of values of the reductant being greater than or equal to the end determination threshold S, FIG. 8B is a timechart showing a case where the routine of the purge control ends due to the air-fuel ratio being less than or equal to a predetermined value, and FIG. 8C is a timechart showing a case where the routine of the purge control ends due to a blow-by of the reductant and the air-fuel ratio being less than or equal to a predetermined value. Note that FIG. 8A is a timechart showing a case where the routine of the purge control ends due to the determination condition of the first determination unit being satisfied, and FIG. 8B and FIG. 8C are timecharts showing cases where the routine of the purge control ends due to the determination condition of the second determination unit being satisfied.

First, a case where the routine of the purge control ends as a result of the sum T of values of the reductant being greater than or equal to the end determination threshold S will be described using FIG. 8A. At timing t11, after the purge flag is set to 1 and the routine of the purge control is started, the air-fuel ratio in the downstream portion of the exhaust passage detected by the second composite sensor 26 becomes a value representing a state which is near the stoichiometric, the downstream portion of the exhaust passage being located at the downstream of the NOx catalyst 23 in the exhaust passage. Note that the air-fuel ratio does not immediately become a value which is near the stoichiometric after the routine of the purge control is started. This is because it takes a certain amount of time for the combustion gas to reach the second composite sensor 26 after switching to rich combustion (purge control). Furthermore, after the routine of the purge control starts, the sum T of values of the reductant gradually increases.

As reduction at the NOx catalyst 23 proceeds, at timing t12, the sum T of values of the reductant is greater than or equal to the end determination threshold S, and the routine of the purge control ends. The purge flag is set to 0, and the sum T of values of the reductant is set to 0. Then, after the routine of the purge control ends and lean control starts, the air-fuel ratio detected by the second composite sensor 26 becomes a value representing the lean state.

In many cases, the routine of the purge control ends as a result of the sum T of values of the reductant being greater than or equal to the end determination threshold S as in FIG. 8A. In such a method of ending the routine of the purge control, reduction of the stored NOx performed by the NOx catalyst 23 is sufficiently performed due to reductant being supplied until the end determination threshold S set in advance. Furthermore, compared to the end determination condition of the second determination unit, the rich component does not leak to the downstream portion of the exhaust passage, which is preferable, the downstream portion of the exhaust passage being located at a downstream of the NOx catalyst 23 in the exhaust passage.

Next, a case where the routine of the purge control ends due to the air-fuel ratio being less than or equal to the predetermined value will be described using FIG. 8B. At timing t21, after the purge flag is set to 1 and the routine of the purge control is started, the air-fuel ratio in the downstream portion of the exhaust passage detected by the second composite sensor 26 becomes a value representing a state which is near the stoichiometric, the downstream portion of the exhaust passage being located at a downstream of the NOx catalyst 23 in the exhaust passage. Furthermore, after the routine of the purge control starts, the sum T of values of the reductant gradually increases.

As reduction at the NOx catalyst 23 proceeds, at timing t22, when reduction of the stored NOx performed by the NOx catalyst 23 ends and the rich component flows to the downstream portion of the exhaust passage, the air-fuel ratio detected by the second composite sensor 26 is less than or equal to the predetermined value, the downstream portion of the exhaust passage being located at a downstream of the NOx catalyst 23 in the exhaust passage. When the air-fuel ratio is less than or equal to the predetermined value, the routine of the purge control ends. Then, the purge flag is set to 0, and the sum T of values of the reductant is set to 0. After the routine of the purge control ends and lean control starts, the air-fuel ratio detected by the second composite sensor 26 becomes a value representing the lean state.

At the stage that the routine of the purge control has ended, the sum T of values of the reductant is greater than or equal to the prohibition value but is less than the end determination threshold S. As a result, it is considered that the end determination threshold S was too large, and the values of the reductant were excessive. In this case, the end determination threshold S is changed so that it becomes smaller from the next purge control onwards.

As shown in FIG. 8B, when the end determination threshold S set in advance is too large and the values of the reductant are excessive, the rich component flows to the downstream portion of the exhaust passage and the air-fuel ratio detected at the second composite sensor 26 is less than or equal to the predetermined value, before the sum T of values of the reductant is greater than or equal to the end determination threshold S, the downstream portion of the exhaust passage being located at a downstream of the NOx catalyst 23 in the exhaust passage. As a result of ending the routine of the purge control when the rich component flows to the downstream portion of the exhaust passage, excessive discharge of the rich component can be suppressed, the downstream portion of the exhaust passage being located at a downstream of the NOx catalyst 23 in the exhaust passage.

In this way, the routine of the purge control ends when either of the two end determination conditions of the routine of the purge control, namely the end determination condition shown in FIG. 8A and the end determination condition shown in FIG. 8B, are satisfied. For this reason, when the end determination threshold S is correctly set, the routine of the purge control ends without the rich component leaking to the downstream portion of the exhaust passage, the downstream portion of the exhaust passage being located at a downstream of the NOx catalyst in the exhaust passage. On the other hand, when the end determination threshold S is too large and the values of the reductant are excessive, the leakage amount of the rich component can be minimized by ending the routine of the purge control when the air-fuel ratio is less than or equal to the predetermined value.

A case where the routine of the purge control ends due to a blow-by of the reductant and the air-fuel ratio being less than or equal to the predetermined value will be described using FIG. 8C. At timing t31, after the purge flag is set to 1 and the routine of the purge control is started, the air-fuel ratio in the downstream portion of the exhaust passage detected by the second composite sensor 26 becomes a value representing a state which is near the stoichiometric, the downstream portion of the exhaust passage being located at a downstream of the NOx catalyst 23 in the exhaust passage. Furthermore, after the routine of the purge control starts, the sum T of values of the reductant gradually increases.

At timing t32, when the reductant concentration momentarily becomes high, and a blow-by of the reductant occurs resulting in the rich component flowing to the downstream portion of the exhaust passage, the air-fuel ratio detected by the second composite sensor 26 is less than or equal to the predetermined value, the downstream portion of the exhaust passage being located at a downstream of the NOx catalyst 23 in the exhaust passage. When the air-fuel ratio is less than or equal to the predetermined value, the routine of the purge control ends. Then, the purge flag is set to 0, and the sum T of values of the reductant is set to 0. After the routine of the purge control ends and lean control starts, the air-fuel ratio detected by the second composite sensor 26 becomes a value representing the lean state.

At the stage that the routine of the purge control has ended, because the sum T of values of the reductant is less than the prohibition value, it is assumed that a blow-by of the reductant has occurred. In this case, a correction which decreases the end determination threshold S from the next purge control onwards is not performed. This is because there is a concern that, if a decreasing change is made to the end determination threshold S, when a blow-by has occurred, a state in which NOx is unreduced may occur from the next purge control onwards.

The present embodiment described above has the following effects.

In the embodiment, two determination conditions are provided as end conditions of the routine of the purge control, and the routine of the purge control ends at the point in which the earlier of the end determination conditions is satisfied. In the first end determination condition, the sum T of values of the reductant is calculated by integrating the values of the reductant supplied to the NOx catalyst 23 since the start of the routine of the purge control, and the routine of the purge control ends when the sum T of values of the reductant is greater than or equal to the end determination threshold S set in advance.

On the other hand, in the second end determination condition, the routine of the purge control is continued until the air-fuel ratio detected by the second composite sensor 26 provided in the downstream portion of the exhaust passage is less than or equal to the predetermined value, that is to say, until the reductant component actually leaks to the downstream portion of the exhaust passage, the downstream portion of the exhaust passage being located at a downstream of the NOx catalyst 23 in the exhaust passage. Therefore, it is usually more desirable for the routine of the purge control to end due to the first end determination condition. This is because, in the second end determination condition, the reductant component leaks to the downstream portion of the exhaust passage, the downstream portion of the exhaust passage being located at a downstream of the NOx catalyst 23 in the exhaust passage, while in the first end determination condition, it is possible to end the routine of the purge control without the reductant component leaking to the downstream portion of the exhaust passage, the downstream portion of the exhaust passage being located at a downstream of the NOx catalyst 23 in the exhaust passage.

However, in the first end determination condition, the end determination threshold S set in advance may cause the values of the reductant to become excessive due to individual differences or deterioration of the NOx catalyst 23, or setting errors or the like. Therefore, when only the first end determination condition is provided, the reductant is continuously supplied until the sum of values of the reductant is greater than or equal to the end determination threshold S set in advance, even after reduction of the stored NOx performed by the NOx catalyst 23 has ended. Therefore, in the present embodiment, the second end determination condition is provided that the routine of the purge control is ended when the air-fuel ratio detected by the second composite sensor 26 provided in the downstream portion of the exhaust passage is less than or equal to a predetermined value, the downstream portion of the exhaust passage being located at a downstream of the NOx catalyst 23 in the exhaust passage. Consequently, even when the supply amount has become excessive due to a setting error or the like, excessive discharge of the reductant component caused by the setting error or the like can be suppressed by ending the routine of the purge control when the air-fuel ratio is less than or equal to the predetermined value.

Furthermore, if the routine of the purge control ends as a result of the air-fuel ratio detected by the second composite sensor 26 being less than or equal to the predetermined value before is the ECU 30 determines that the sum T of values of the reductant is greater than or equal to the end determination threshold S that has been set, it is considered that a preset value of the end determination threshold S is too large and the values of the reductant are excessive due to individual differences or deterioration of the NOx catalyst 23, or setting errors or the like. In this case, a decrease changing that changing a preset value of the end determination threshold S used in the routine of the control terminal to an updated value used in a next routine of the purge control, is made, the updated value of the end determination threshold used in the next routine of the purge control being smaller than the preset value of the end determination threshold used in the routine of the purge control. As a result, end determination threshold S becomes smaller from the next purge control onwards, which results in the values of the reductant becoming smaller, and it is possible to prevent the values of the reductant from becoming excessive.

When the sum T of values of the reductant is smaller than the end determination threshold S, and is also less than the prohibition value, there is a high probability that NOx reduction is not complete in the NOx catalyst 23, and it is considered that the phenomenon of the air-fuel ratio being less than or equal to the predetermined value was caused by a momentarily high-concentration output. If a correction is performed in this case, the amount of reduction will become insufficient in the next purge control. For this reason, when the sum T of values of the reductant is less than the prohibition value, changes that reduce the end determination threshold S are prohibited. As a result, it is possible to prevent a shortage in the reductant occurring due to erroneous learning.

Furthermore, as a result to individual differences in the NOx catalyst 23 and the like, a shortage of the reductant may occur depending on the end determination threshold S that has been set. If a shortage of the reductant occurs, unreduced NOx accumulates in the NOx catalyst 23, and a NOx leakage occurs in the downstream portion of the exhaust passage, the downstream portion of the exhaust passage being located at a downstream of the NOx catalyst 23 in the exhaust passage. Therefore, the second composite sensor 26, which is capable of detecting NOx, is provided in the downstream portion of the exhaust passage, and the NOx leakage amount is detected to calculate the NOx storage rate on the basis of the NOx leakage amount, the downstream portion of the exhaust passage being located at a downstream of the NOx catalyst 23 in the exhaust passage. If the NOx storage rate is less than or equal to a predetermined storage rate, an increasing change that changing the preset value of the end determination threshold S used in the routine of the control terminal to a controlled value used in a next routine of the purge control, is made, the controlled value of the end determination threshold used in the next routine of the purge control being larger than the preset value of the end determination threshold used in the routine of the purge control. As a result, the values of the reductant supplied are increased from the next purge control onwards, which suppresses the accumulation of unreduced NOx, and prevents the NOx storage performance from deteriorating.

Other Embodiments

The present disclosure is not limited to the embodiment described above, and, for example, may also be implemented as follows.

Figure 9:
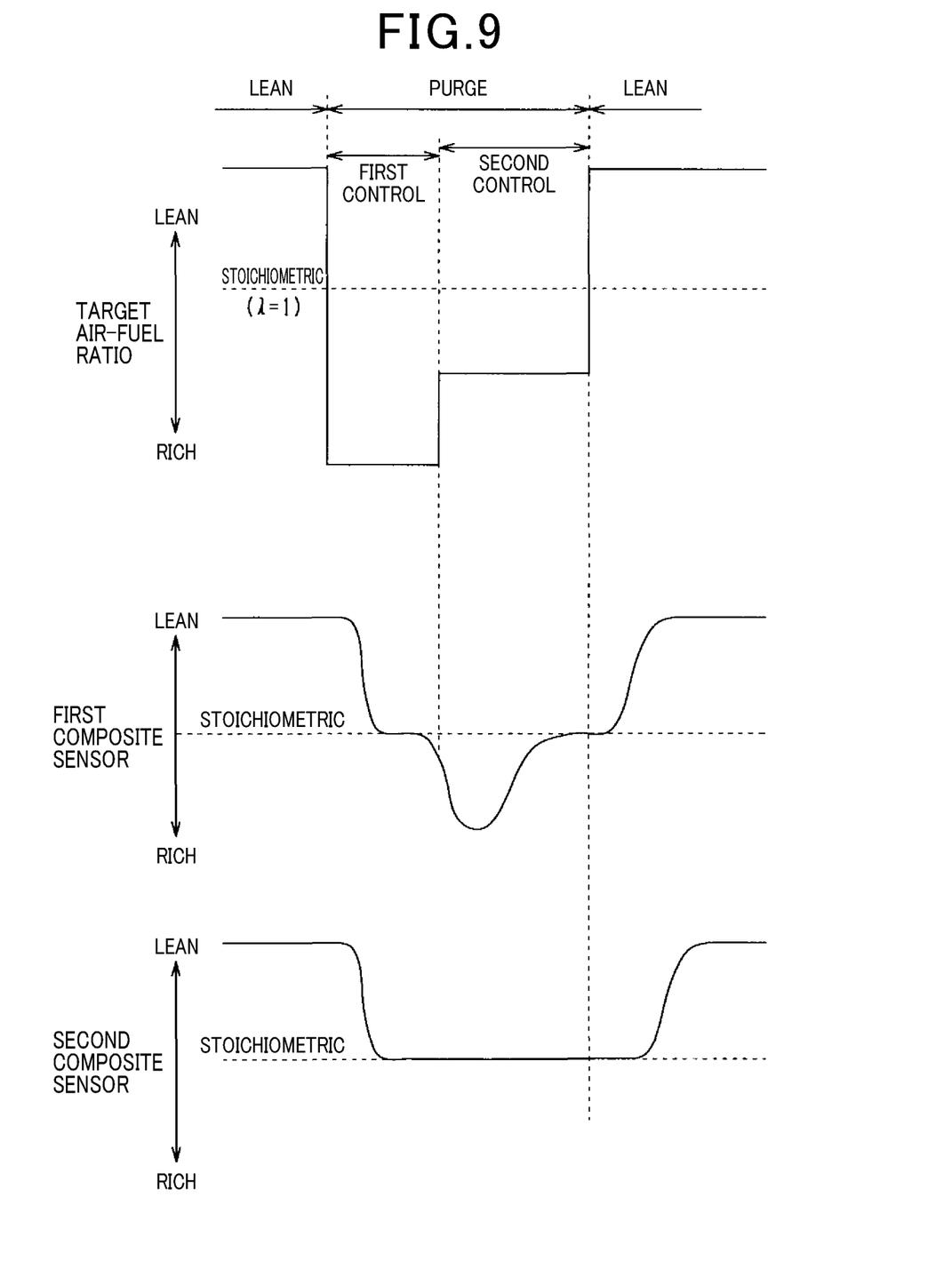
FIG. 9 is a time chart showing a target air-fuel ratio during purge control according to another embodiment.

Rather than being held constant, the target air-fuel ratio during the routine of the purge control may be set so that the richness degree becomes high until NOx reduction performed by the three-way catalyst 22 ends. FIG. 9 is a time chart showing the target air-fuel ratio during purge control.

After a first control that causes a richness degree of the exhaust gas to be set to a high value is performed after the start of the routine of the purge control, the air-fuel ratio detected by the first composite sensor 25 which is located at the downstream of the three-way catalyst 22 changes from a value representing the lean state to a value representing the stoichiometric state. During the period that the first control is performed and a certain amount of stored oxygen remains in the three-way catalyst 22, the rich component (HC, CO, and the like) in the exhaust gas is consumed in a reaction with the oxygen stored in the three-way catalyst 22. Consequently, the air-fuel ratio of the exhaust gas flowing out from the three-way catalyst 22 becomes a value which is near the stoichiometric. Then, during the period that the first control is performed and until the remaining amount of oxygen stored in the three-way catalyst 22 becomes small, the air-fuel ratio detected by the first composite sensor 25 is maintained at a value which is near the stoichiometric.

When the amount of oxygen stored in the three-way catalyst 22 becomes low, the concentration of the rich component that passes through the three-way catalyst 22 and is supplied to the NOx catalyst 23 increases. As a result, the air-fuel ratio detected by the first composite sensor 25 changes to a value representing the rich side. When it is detected that the air-fuel ratio at the first composite sensor 25 has changed to a value representing the rich side, a switch is made to a second control, and the richness degree is lowered. As a result of the air-fuel ratio being switched in this way, NOx reduction performed by the three-way catalyst 22 is rapidly performed, and the richness degree is also lowered after NOx reduction performed by the three-way catalyst 22 ends. Consequently, the leakage amount of the rich component can be made small when a leakage of the rich component occurs from the NOx catalyst 23 due to an excess of the reductant.

Further, when the target air-fuel ratio is set in two stages in this manner, values obtained by multiplying the target air-fuel ratio obtained in FIG. 7 by different coefficients for the first control and the second control can be used as the target air-fuel ratios. The coefficient of the first control is set to be larger than the coefficient of the second control. Moreover, in addition to the case of two stages shown in FIG. 7, the target air-fuel ratio during the routine of the purge control may be implemented by being split into a plurality of stages, or may be linearly changed.

In the case where the target air-fuel ratio is set in two stages, in S20 of the processing of FIG. 3, is the ECU 30 determines whether the first control or the second control is currently being and then the target air-fuel ratio is set and the reductant is supplied. Furthermore, the sum T of values of the reductant is acquired in S26 of the processing of FIG. 3, and in S27, instead of determining whether the sum T of values of the reductant is greater than or equal to the prohibition value, the ECU 30 may determine that a blow-by of the reductant has occurred when the air-fuel ratio is less than or equal to the predetermined value during the first control. This is because a blow-by of the reductant is likely to occur during the first control that causes a richness degree of the reductant to be set to a high value. The method of determining whether a blow-by has occurred according to whether the timing in which the air-fuel ratio is less than or equal to the predetermined value was during the first control will be described in detail. Instead of S26 and S27, the ECU 30 determines whether the first control is being performed. Then, if the ECU 30 determines that the first control is being performed, that is to say, if the air-fuel ratio is less than or equal to the predetermined value during the first control, the ECU 30 determines that a blow-by occurred, and the processing ends without performing a correction. On the other hand, if the ECU 30 determines that the first control is not being performed, that is to say, if the air-fuel ratio is less than or equal to the predetermined value during the second control, in S28, a change is made that decreases the end determination threshold S. Such a determination can be made after determining whether the sum T of values of the reductant is greater than or equal to the prohibition value.

In this way, when the three-way catalyst 22 is provided in the upstream of the NOx catalyst 23, almost no reductant is supplied to the NOx catalyst 23 after the routine of the purge control is started unless NOx reduction performed by the three-way catalyst 22 ends. As a result, in order for NOx reduction to be rapidly performed by the three-way catalyst 22 while suppressing leakages of the rich component that occur in the case of an excess, it is preferable for the richness degree initially be high, and it is desirable for the richness degree to be low after NOx reduction performed by the three-way catalyst 22 ends. Therefore, the first control which causes a richness degree of the reductant to be set to a high value is performed at the start of the routine of the purge control, and the second control which causes a value of the richness of the exhaust gas to be lower than the high value of the richness degree of the reductant is performed thereafter. Because a blow-by of the reductant is likely to occur during the first control that causes a richness degree of the reductant to be set to the high value, it can be assumed that a blow-by of the reductant has occurred when the air-fuel ratio in the downstream portion of the exhaust passage is less than or equal to the predetermined value during the period that the first control is being performed, the downstream portion of the exhaust passage being located at a downstream of the NOx catalyst 23 in the exhaust passage. Therefore, when the routine of the purge control ends as a result of the air-fuel ratio in the downstream portion of the exhaust passage being less than or equal to the predetermined value during the first control, correction of the supply amount is prohibited, the downstream portion of the exhaust passage being located at a downstream of the NOx catalyst 23 in the exhaust passage. As a result, it is possible to prevent a shortage in the reductant occurring due to erroneous learning.

In the routine of the purge control, in addition to performing an air-fuel ratio feedback control that matches the actual air-fuel ratio to the target air-fuel ratio, a configuration may be used in which an open control sets a fuel amount serving as a rich air-fuel ratio as the fuel injection amount.

When the engine 10 is switched from lean operation to normal operation (stoichiometric state operation), the ECU 30 may perform the processing of FIG. 3 regardless of the cycle, and in S11, the ECU 30 may determine that the start condition of the routine of the purge control has been satisfied and then perform the routine of the purge control. In this case, when a switch is made from lean operation to operation in a stoichiometric state, the switch in operation state can be made after the NOx stored in the NOx catalyst 23 and the like has been processed in advance.

An oxidation catalyst may be used instead of the three-way catalyst 22. Furthermore, another catalyst may be provided in addition to the three-way catalyst 22 and the NOx catalyst 23.

A supercharger that compresses the air on the intake side by the flow of exhaust gas may be provided between the exhaust passage 20 and the intake passage 14.

The internal combustion engine is not limited to a gasoline engine that injects fuel into the combustion chamber 12, and may be a gasoline engine that injects fuel into the intake passage 14, or a diesel engine.

The control unit (control device) and the method described in the present disclosure may be realized by a dedicated computer which is provided by configuring a memory and a processor programmed so as to execute one or more functions embodied by a computer program. Alternatively, the control unit and the method described in the present disclosure may be realized by a dedicated computer which is provided by configuring a processor with one or more dedicated hardware logic circuits. Also, the control unit and the method described in the present disclosure may be realized by one or more dedicated computers which are configured by a combination of a memory and a processor programmed so as to execute one or more functions, and a processor configured by one or more hardware logic circuits. Furthermore, the computer program may be stored in a computer-readable, non-transitory, tangible recording medium as instructions to be executed by a computer.

The present disclosure has been described based on the embodiments; however, it is understood that the present disclosure is not limited to these embodiments and structures. The present disclosure also includes various modifications and equivalent variations. In addition, various combinations and configurations, and other combinations and configurations including only one additional element, two or more additional elements, or a portion of one additional element, are also within the spirit and scope of the present disclosure.

What is claimed is:

1. A control device for an exhaust purging system that comprises:
   a NOx catalyst provided in an exhaust passage of an internal combustion engine, the NOx catalyst serving as an NOx storage-reduction catalyst that stores NOx included in an exhaust gas and reduces the stored NOx with a reductant to accordingly purify the stored NOx; and
   an air-fuel ratio sensor that detects an air-fuel ratio in a downstream portion of the exhaust passage, the downstream portion of the exhaust passage being located at a downstream of the NOx catalyst in the exhaust passage,
   the control device, which performs a routine of a purge control that supplies the reductant into an upstream portion of the exhaust passage to cause the NOx catalyst to perform NOx reduction, the upstream portion of the exhaust passage being located at an upstream of the NOx catalyst in the exhaust passage, comprising:
   a sum calculation unit that calculates the sum of values of the reductant that have been supplied to the NOx catalyst since the start of the routine of the purge control;
   a first determination unit that determines whether the sum of the values of the reductant calculated by the sum calculation unit is greater than or equal to an end determination threshold;
   a second determination unit that determines whether the air-fuel ratio in the downstream portion of the exhaust passage detected by the air-fuel ratio sensor is less than or equal to a predetermined value after the start of the routine of the purge control; and
   a purge ending unit that ends the routine of the purge control in response to an earlier one of a first affirmative determination that the sum of the values of the reductant calculated by the sum calculation unit is greater than or equal to the end determination threshold and a second affirmative determination that the air-fuel ratio detected by the air-fuel ratio sensor is less than or equal to the predetermined value after the start of the routine of the purge control.

2. The control device of an exhaust purging system according to claim 1, further comprising:
   a decrease changing unit configured to, when the routine of the purge control is ended in response to the second affirmative determination that the air-fuel ratio detected by the air-fuel ratio sensor is less than or equal to the predetermined value after the start of the routine of the purge control earlier than the first affirmative determination that the sum of the values of the reductant calculated by the sum calculation unit is greater than or equal to the end determination threshold, change a preset value of the end determination threshold used in the routine of the control terminal to an updated value used in a next routine of the purge control,
   the updated value of the end determination threshold used in the next routine of the purge control being smaller than the preset value of the end determination threshold used in the routine of the purge control.

3. The control device of an exhaust purging system according to claim 2, wherein
   the decrease changing unit is configured to, when the routine of the purge control is ended in response to the second affirmative determination that the air-fuel ratio detected by the air-fuel ratio sensor is less than or equal to the predetermined value after the start of the routine of the purge control, prohibit change of the preset value of the end determination threshold used in the routine of the purge control upon a determination that the sum of the values of the redundant calculated by the sum calculation unit is smaller than a prohibition value, the prohibition value being set to be smaller than the preset value of the end determination threshold.

4. A control device for an exhaust purging system according to claim 2, wherein a three-way catalyst is provided in the upstream portion of the exhaust passage, the upstream portion of the exhaust passage being located at the upstream of the NOx catalyst in the exhaust passage;

the reductant is a fuel;

the routine of the purge control comprises:

a first control routine that causes a richness degree of the exhaust gas to be set to a high value so that a predetermined reduction operation is carried out by the three-way catalyst; and a second control routine, the control device performing, after an end of the first control routine, the second control routine to cause a value of the richness of the exhaust gas to be lower than the high value of the richness degree of the exhaust gas; and the decrease changing unit is configured to, when the routine of the purge control is ended in response to the second affirmative determination that the air-fuel ratio detected by the air-fuel ratio sensor is less than or equal to the predetermined value during the first control routine, prohibit change of the preset value of the end determination threshold used in the routine of the purge control.

5. A control device for an exhaust purging system according to claim 1, wherein a NOx sensor is provided in the downstream portion of the exhaust passage, the downstream portion of the exhaust passage being located at the downstream of the NOx catalyst in the exhaust passage; and the control device further comprises:

a storage rate calculation unit that calculates, during a lean control in which an air-fuel ratio of the internal combustion engine is lean, a NOx storage rate of the NOx catalyst based on a NOx inflow amount to the NOx catalyst and a NOx leakage amount detected by the NOx sensor; and an increase changing unit configured to, in response to the NOx storage rate calculated by the storage rate calculation unit being less than or equal to a predetermined storage rate, change the preset value of the end determination threshold used in the routine of the control terminal to a controlled value used in a next routine of the purge control, the controlled value of the end determination threshold used in the next routine of the purge control being larger than the preset value of the end determination threshold used in the routine of the purge control.

* * * * *